United States Patent [19]

Maricle et al.

[11] Patent Number: 4,849,253
[45] Date of Patent: Jul. 18, 1989

[54] METHOD OF MAKING AN ELECTROCHEMICAL CELL ELECTRODE

[75] Inventors: Donald L. Maricle, East Glastonbury; Howard S. Carr, Bloomfield, both of Conn.

[73] Assignee: International Fuel Cell Corporation, South Windsor, Conn.

[21] Appl. No.: 55,573

[22] Filed: May 29, 1987

[51] Int. Cl.$^4$ .............................................. B05D 5/12
[52] U.S. Cl. .................................... 427/115; 427/244; 427/360; 427/369; 427/376.6; 427/388.5; 427/424; 427/427
[58] Field of Search ............... 427/115, 244, 369, 360, 427/376.6, 388.5, 424, 427

[56] References Cited

U.S. PATENT DOCUMENTS

| | | | |
|---|---|---|---|
| 3,096,206 | 7/1963 | Wade | 117/121 |
| 3,900,602 | 8/1975 | Rummel | 427/115 |
| 4,043,933 | 8/1977 | Breault et al. | 252/182 |
| 4,163,811 | 8/1979 | Kohlmayer et al. | 427/115 |
| 4,175,055 | 11/1979 | Goller et al. | 252/425.3 |
| 4,177,159 | 12/1979 | Singer | 252/428 |
| 4,233,181 | 11/1980 | Goller et al. | 252/425.3 |
| 4,301,218 | 11/1981 | Benczur-Ürmössy | 429/42 |

*Primary Examiner*—Bernard Pianalto
*Attorney, Agent, or Firm*—Darby & Darby

[57] ABSTRACT

An electrochemical cell electrode is produced by applying a plurality of thin layers of a catalyst material onto a substrate, filtering and compacting the layers between additions, until a desired catalyst amount is achieved. The catalyst bearing substrate is then dried and sintered to form an electrode. Utilizing a serial application technique minimizes surface cracking while maximizing throughput by allowing automation of the electrode production process.

9 Claims, 1 Drawing Sheet

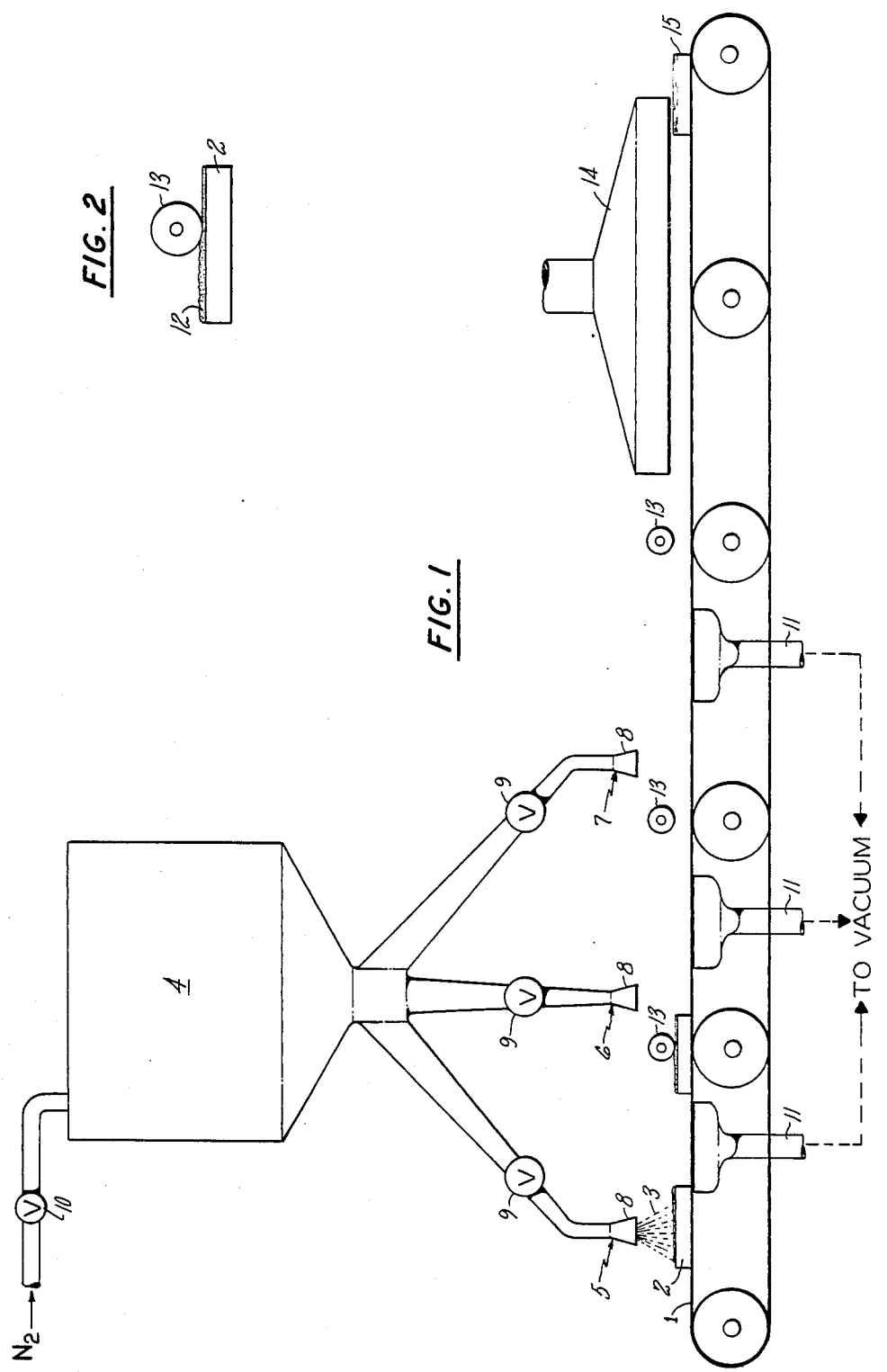

METHOD OF MAKING AN ELECTROCHEMICAL CELL ELECTRODE

DESCRIPTION

TECHNICAL FIELD

This invention relates to electrochemical cell electrodes and more particularly to a method for making electrochemical cell electrodes utilizing the serial addition and compaction of multiple thin layers of a catalyst to a substrate.

BACKGROUND ART

Electrodes for use in electrochemical cells such as fuel cells are well known in the art. One common type of fuel cell electrode is the gas diffusion electrodes. In a fuel cell, a pair of gas diffusion electrodes are disposed on either side of a compartment containing a matrix soaked with an electrolyte. A catalyst is disposed on the electrolyte facing surface of each electrode, with hydrogen or another gaseous fuel fed to the back side of one electrode while oxygen or air is fed to the back side of the other electrode. The gases enter the electrodes and react with the electrolyte in the presence of the catalyst.

Many types of gas diffusion electrodes are described in the literature. One type of gas diffusion electrode comprises a layer of polytetrafluorethylene (PTFE) mixed with a catalyst supported on carbon particles (i.e., catalyzed carbon), the layer being disposed on the surface of a porous carbon substrate (e.g. carbon paper). The PTFE (or any other compatible hydrophobic polymer) prevents the electrolyte from filling up the electrode to such an extent that sufficient fuel or oxidant cannot reach the catalyst. A gas diffusion electrode of this type is described in commonly owned U.S. Pat. No. 3,857,737 to Kemp et al.

Another type of gas diffusion electrode comprises a carbon paper substrate with a layer of uncatalyzed carbon mixed with PTFE applied to the surface thereof. Unsupported catalyst is then applied to the carbon/PTFE layer. An electrode of this type is described in commonly owned U.S. Pat. No. 3,972,735 to Breault.

Several methods are known in the industry for adding the catalyst layer to the electrode. One technique for applying the catalyst layer to the substrate is the one step direct filtration method, where a catalyzed powder is mixed in an aqueous dispersion and blended to form a co-suspension of carbon and PTFE. The suspension is caused to floc, such as by heating or adding a floccing agent, with floccing involving the coalescence of catalyzed or uncatalyzed carbon particles with the PTFE particles. A proper floc is one which achieves uniform size agglomerates of catalyzed or uncatalyzed carbon and PTFE particles and a homogenous distribution or mix of the particles. After floccing, excess liquid is decanted and the floc is applied to the surface of a porous substrate which acts as a filter. Liquids pass through the substrate, leaving a layer of the desired floc on the surface. The article is then compacted, dried and sintered to form an electrode.

One problem with the one step addition and filtration of the aqueous floc directly onto the substrate is the production of a rough, cracked catalyst surface. As liquid is filtered from the deposited solids mixture, mud cracks develop as the catalyst layer shrinks. Compaction smooths the surface, but does not relieve the internal shrinkage stresses, particularly in relatively thick catalyst layers. Consequently, during drying, further shrinkage occurs and macrocracks form which extend into the layer, providing potential sites for matrix failure and short circuiting within a fuel cell.

Another technique for applying a catalyst to an electrode substrate utilizes a dry floc method. In U.S. Pat. No. 4,233,181 to Goller et al., a method is disclosed which describes mixing of a catalyzed or uncatalyzed carbon powder in an aqueous PTFE dispersion which is then blended into an alcohol water solution to form a co-suspension of carbon and PTFE. The suspension is caused to floc, such as by heating or adding a floccing agent, and the excess liquid is removed by filtration. The wet flocc is then dried and pulverized to a fine powder and applied to the surface of an electrode substrate by dispersing the powder as a cloud in a chamber over the substrate and pulling the powder into the substrate by drawing a vacuum under the substrate. The powder is then compacted and sintered.

Several problems have been experienced in the handling and storage of the powdered dry floc material, particularly in the efforts to use the dry floc powder in an automated electrode manufacturing procedure. The dry floc powder tends to agglomerate into larger particle sized due to the PTFE components of the floc and is difficult to work with since the powder does not flow freely from hoppers and tends to stick to the surfaces of automated materials handling equipment. Consequently, a method is needed for producing electrochemical cell electrodes in a faster more economical production process while minimizing mud cracking and material handling problems.

DISCLOSURE OF INVENTION

According to the present invention, a method is disclosed for depositing and compacting a predetermined amount of a catalyst in fractional layers to an underlying substrate, the sum of the layers equaling the total desired catalyst amount. This method inclues the steps of (1) preparing an aqueous floc of the catalyst, (2) applying the aqueous floc to the substrate in an amount which is a fraction of the total catalyst amount required, (3) filtering the aqueous portion of the floc through the substrate, thereby providing a solids rich layer, (4) compacting the catalyst layer to form an essentially smooth surface, (5) serially repeating the applying, filtering and compacting steps until the total catalyst amount is deposited, thereby serially depositing multiple thin fractional uniformly compacted and densified layers of catalyst to the substrate, (6) drying the catalyst bearing substrate and (7) sintering the catalyst bearing substrate. Utilizing serial addition, filtration and compaction assures uniform compaction and densification prior to drying and sintering, thereby minimizing mud cracking by evenly distributing the shrinkage stresses in the catalyst layer. An essentially smooth crack free electrode surface is the result.

In a preferred embodiment of the present invention, a porous endless belt transports the substrate through a number of spray, filter and roller stations until the desired catalyst amount is deposited and then additionally transports the substrate through drying and sintering stations. Electrodes with a wide range of catalyst requirements are, therefore, producible in a continuous operation, maximizing production output while attaining an optimized catalyst surface.

BRIEF DESCRIPTION OF DRAWING

FIG. 1 is a schematic representation of the serial deposition and compacting process of the present invention utilizing an endless porous belt.

FIG. 2 is an exploded view of a catalyst bearing substrate.

BEST MODE FOR CARRYING OUT THE INVENTION

In carrying out the invention, an intimate admixture of electrocatalyst particles and hydrophobic polymer particles is made up as an aqueous suspension. In the usual construction, the weight of the metal catalyst may be anywhere from 1-20% of the total electrocatalyst weight, but is preferably 5 to 10%. The electrocatalyst-/polymer admixture generally contains from about 70 to 40 weight percent electrocatalyst, and from 30 to 60 weight percent polymer. The optimum percentage for a supported electrocatalyst is from about 45 to 55 weight percent of the admixture, balance polymer. Such ratios of polymer to electrocatalyst are conveniently formed into an aqueous suspension using colloidal polymer particles and metal blacks. The pH of the suspension is generally adjusted by adding an acid, base, or salt to obtain the optimum pH which causes the suspension to flocculate. Once this is done, the floc may be applied to a suitable substrate, such as a porous metal or carbon substrate.

According to the present invention, the flocculate is deposited, filtered and compacted in fractional layers on an underlying substrate, with the sum of the layers equaling the desired catalyst amount. The method for producing an electrode requires preparing an aqueous floc of the catalyst, and applying an amount of the aqueous floc on one side of the substrate to deposit a first amount of catalyst. The first amount is a fraction of the desired catalyst amount. Vacuum is applied to the opposite side of the substrate to filter the aqueous liquid through the substrate. The catalyst layer is then compacted to uniformly compress and densify the catalyst. Additional thin layers of catalyst are applied until the desired catalyst thickness is achieved. The catalyst bearing substrate is then dried and sintered to form an electrochemical cell electrode.

In a preferred embodiment of the present invention, illustrated in FIG. 1, a porous endless belt 1 transports a porous substrate 2 through a series of processing steps. The substrate 2 passes progressively through spray application, filter and roller stations until the desired catalyst thickness is achieved. Referring to FIG. 1, an aqueous floc 3, such as one previously disclosed, is prepared and stored in a feed tank 4, which is fluidically connected to three spray floc application stations 5, 6 and 7, situated over the endless porous belt 1. Each station includes one or more spray nozzles 8 and shutoff valves 9. While three stations are illustrative, it will be understood by those skilled in the art that the number of stations required is a function of total catalyst amount required, degree of crack tolerance acceptable for a given electrode and the desired thickness of each fractional layer. In order to drive the floc 3 through the spray nozzles 8, the tank 4 is pressurized using air or nitrogen through a valve 10. Of course, the floc could also be pumped to the spray stations.

The porous belt 1 includes a vacuum filtration system 11 with a vacuum drawn on the underside of the porous belt, drawing liquid through the porous substrate 2. This leaves a solids rich catalyst layer 12 on the substrate, (see FIG. 2) which is then compacted by a roller 13, consolidating and densifying the layer and reducing shrinkage stresses within each layer evening the surface and closing any cracks formed during filtration. The substrate then receives a second spray application at station 6, followed by filtration and compaction, and a third layer at station 7. After the third layer is filtered and compacted, the desired catalyst amount is achieved.

After catalyst addition, the electrode is heated to a temperature sufficient to remove any remaining liquid from the floc and then heated to sinter the catalyst-/polymer layer. Since the sintering temperature of the polymer is usually sufficiently high to volatilize the liquid (For PTFE about 320° C.), drying and sintering may be combined in a single step. referring to FIG. 1, drying and sintering are undertaken in one step with the catalyst/substrate traveling on the endless belt 1 through a drying furnace 14, thereby forming an electrode 15.

The catalyst/polymer floc may be applied to the substrate at catalyst loadings from about 0.05 mg/cm$^2$ up to about 10 mg/cm$^2$. While an exemplary range, it will be understood that up to as high as about 35 mg/cm$^2$ of electrode surface may be used. Normally, the lowest effective catalyst loading is desired to minimize costs due to the expense of the catalyst. Of course, the amount of catalyst deposited according to the present invention may be adjusted by increasing or decreasing the number of catalyst addition, filtration and compaction stations. For example, a 10 station production line could be constructed, capable of depositing from 1 to 10 layers of catalyst. In addition, different types or quantities of catalyst flocs could be prepared and applied in a desired sequence between other layers to form a composite catalyst electrode. For example, at station 5, a platinum rich catalyst layer could be applied, filtered and compacted between two platinum poor layers or between two palladium layers. Hydrophobicity may also be varied between layers. This provides maximum flexibility in automated manufacturing of electrodes with differing catalyst requirement.

The substrates particularly useful herein are metal screens, expanded metal, porous sinters of carbon or metal, metal felt, or mesh as well as suitable supports utilizing carbon particles or carbon fibers. It is essential that the structure be electrically conductive and able to withstand the corrosive environment of a fuel cell. Suitable metal supports are from about 0.5 to millimeter thick having a high porosity of from about 35 to 90 percent, and preferably are composed of platinum, nickel, iron, titanium, tantalum, silver, gold and alloys thereof, primarily from the standpoint of resistance of these materials to the corrosive environment of the fuel cell.

The polymers utilized in accordance with the present invention are relatively hydrophobic, and may include polytetrafluoroethylene, polytrifluorochloroethylene, polyvinylfluoride, polyvinylidenefluoride, polytrifluoroethylene, polyfluoroethylenepropylene, perfluoroalkoxypolyethylene, and co-polymers thereof. However, because of its exceptional hydrophobicity as well as its resistance to heat and the corrosive environment of the electrolyte, polytetrafluoroethylene is preferred.

The electrochemically active metal which is to be applied to the support as a suspension with the hydrophobic polymer can be any of various metals which will favorably influence an electrochemical reaction. Such metals include nickel, iron, gold, palladium, platinum, rubidium, ruthenium, osmium, iridium and alloys thereof. Because of their exceptional electrochemical properties, the Group VIII metals of Mendeleyev's Periodic Table are preferred. The most desirable metal is platinum.

Electrodes prepared by the process of the present invention can be employed in various types of fuel cells including those using alkaline and acid electrolytes. Alkaline electrolytes are preferably the alkali metal hydroxides, but can include the alkaline earth hydroxides and alkaline earth carbonates. Preferred alkaline electrolytes are potassium, sodium, rubidium, and cesium hydroxides. The strong mineral acids such as phosphoric acid, sulfuric acid, and hydrochloric acid and organic acids such as trifluoromethanesulfonic acids or polymers thereof are the preferred acid electrolytes. Preferably, the electrodes are employed in acid or alkaline electrolyte fuel cells wherein the electrolyte is trapped or contained in a hydrophilic matrix; however, they could also be used in cells operating with a free electrolyte. Such cells are normally operated from ambient to about 220° C. using oxygen or air as the oxidant, and hydrogen or hydrocarbons as the fuel.

The following specific example is illustrative of this invention:

EXAMPLE

A catalyst supported on carbon particles comprising 10% platinum and 90% carbon is dispersed in an aqueous solution of TFE 30, admixed and ultrasonically blended. TFE 30 teflon from Dupont Corporation, Delaware is a form of PTFE stabilized with a surfactant. The overall composition, by weight, excluding the water, is 5% platinum, 50% carbon, and 45% TFE 30. The pH of the suspension is adjusted to 3 using nitric acid. When the mixture is stirred, the catalyst/TFE suspension completely flocs and settles out of suspension. This floc is then transported to a feed tank and the tank pressurized. The floc is applied to a substrate utilizing a series of airless sprayers disposed over an endless belt equipped for underside vacuum filtration. In between the series of sprayers are disposed compaction devices which comprise cylindrical rollers.

In operation, a substrate made from teflon wet-proofed carbon paper is placed on the endless belt. The substrate travels from a spray applicator station with underside vacuum filtration, to a roller station to another spray station and so on until the desired thickness of catalyst is achieved. For example, about 0.25 mg/cm$^2$ of catalyst may be applied with four serial addition, filtration and compaction stations, with approximately 0.06 mg/cm$^2$ of catalyst applied per station. As the flocculate is applied, vacuum is drawn through the substrate and the belt to remove the aqueous portion of the floc prior to compaction. After the total amount of catalyst is deposited, catalyst bearing substrate is heated to about 280° C. to remove the remaining liquid and then to about 320° C. to sinter the catalyst/polymer layer.

It should be understood that the present invention is not limited to the particular embodiments shown and described herein, but that various changes and modifications may be made without departing from the spirit and scope of the invention as defined by the following claims.

Having thus described the invention, what is claimed is:

1. A method for manufacturing an electrochemical cell electrode comprising: (1) preparing an aqueous floc of a catalyst; (2) applying said aqueous floc onto a substrate in an amount which is a fraction of the total amount required; (3) filtering the aqueous portion of the floc through the substrate, thereby producing a catalyst rich layer; (4) compacting the catalyst layer disposed on the substrate to form an essentially smooth surface; (5) serially repeating said applying, filtering and compacting steps until the total amount of catalyst is deposited, thereby serially depositing a number of thin, fractional, uniformly compacted and densified catalyst layers to the substrate, which together provide the total amount of catalyst required; (6) drying the catalyst bearing substrate; and, (7) sintering the catalyst bearing substrate, thereby forming an electrode.

2. The method of claim 1 wherein said applying step comprises pressurizing said aqueous floc and discharging said pressurized floc through at least one spray fixture.

3. The method of claim 2 wherein said spray fixture comprises an airless sprayer.

4. The method of claim 1 further characterized by providing an endless belt for transporting said substrate progressively through said serial deposition of said catalyst layers and then through said drying and said sintering steps.

5. The method of claim 1 further comprising preparing a plurality of aqueous flocs of catalysts, each floc varying in hydrophobicity, catalyst type or catalyst concentration, said flocs applied, filtered and compacted in a desired sequence to provide a composite catalyst electrode.

6. A method for manufacturing an essentially crack-free electrochemical cell electrode including the steps of applying an aqueous catalyst floc to a substrate, filtering the aqueous liquid portion of the floc through the substrate, compacting the deposited catalyst, drying and sintering, wherein the improvement comprises:
   (1) applying said aqueous floc in an amount which is a fraction of the total amount required;
   (2) dewatering the applied floc, thereby forming a thin solids rich layer which is a fraction of the total desired catalyst amount;
   (3) compacting the catalyst layer disposed on the substrate; and
   (4) serially repeating said applying, dewatering and compacting steps until the total catalyst amount is deposited, thereby serially depositing a number of thin fractional uniformly compacted and densified catalyst layers to the substrate.

7. The method of claim 6 wherein said applying step comprises pressurizing said aqueous floc and discharging said floc through a spray fixture.

8. The method of claim 6 further characterized by providing an endless belt for transporting said substrate progressively through said serial deposition of said catalyst layers and then through said drying and said sintering, thereby providing an electrode in one continuous operation.

9. The method of claim 6 further comprising preparing a plurality of aqueous flocs of catalysts, each floc varying in hydrophobicity, catalyst type or catalyst concentration, said flocs applied, filtered and compacted in a desired sequence to provide a composite catalyst electrode.

* * * * *